March 19, 1946.  D. P. MERCIER  2,397,030
ATTACHMENT FOR FISHING LINES
Filed April 10, 1944   2 Sheets-Sheet 1
Fig. 1.
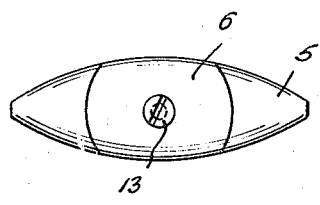
Fig. 2.
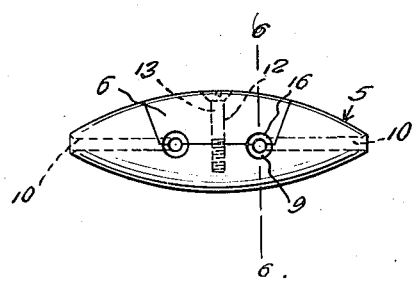
Fig. 3.
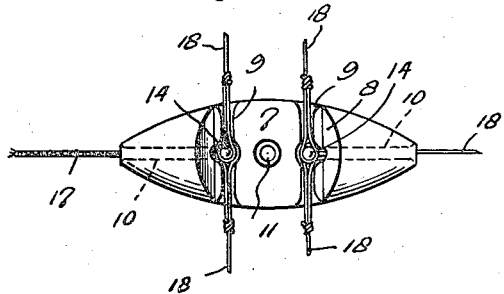
Fig. 4.
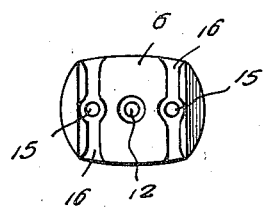
Fig. 5.
Fig. 7.
Fig. 6.
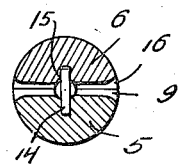
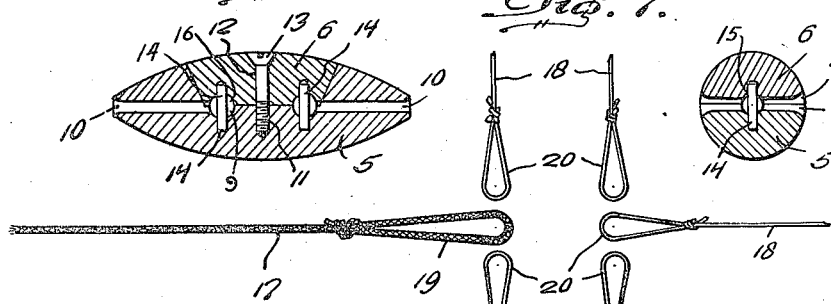
Inventor
Dewey P. Mercier,
By McMorrow and Berman
Attorneys

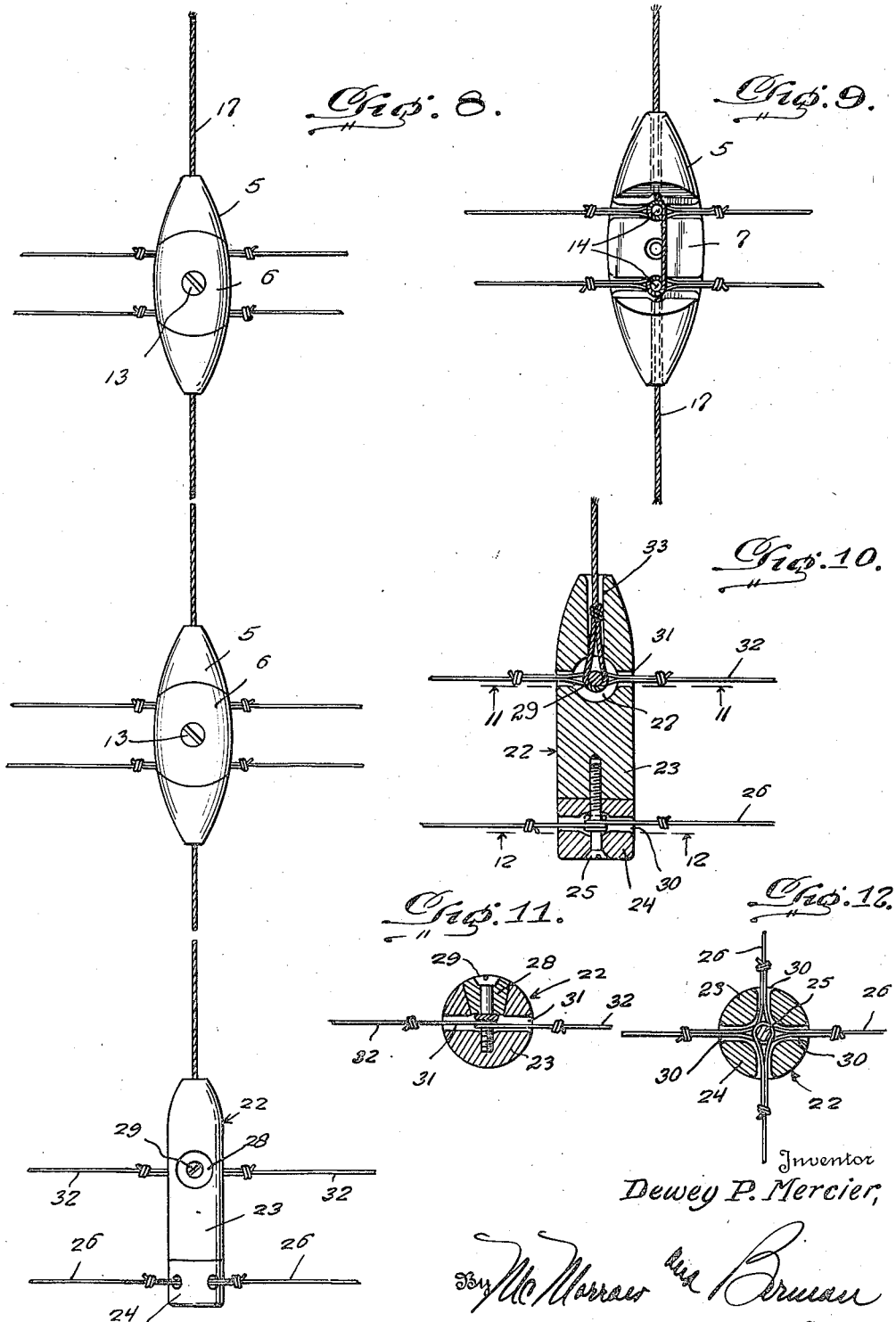

Patented Mar. 19, 1946

2,397,030

UNITED STATES PATENT OFFICE 2,397,030

ATTACHMENT FOR FISHING LINES

Dewey P. Mercier, Burlington, Vt.

Application April 10, 1944, Serial No. 530,347

5 Claims. (Cl. 43—28)

This invention relates to an attachment for fishing lines, and has for the primary object the provision of a device which is especially adapted for quickly securing and releasing from the fishing line a plurality of leads of fishing hooks without the necessity of tying or untying knots and may be easily adjusted endwise of the fishing line for governing the distance the hooks may be made to maintain relative to the bottom of a body of water when the fishing line is therein and in some instances may be utilized as a sinker for the fishing line.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a top plan view illustrating an attachment for a fishing line constructed in accordance with my invention.

Figure 2 is a side elevation illustrating the device.

Figure 3 is a top plan view of the device with a section thereof removed and showing the connection of the fishing line thereto as well as a plurality of fishing hook leads.

Figure 4 is a bottom plan view showing the removable section of the device.

Figure 5 is a vertical sectional view illustrating the device.

Figure 6 is a sectional view taken on the line 6—6 of Figure 2.

Figure 7 is a diagrammatical view showing how the fishing hook leads and the fishing line are arranged relative to each other when applied to a fishing line as a combined sinker and medium of attaching the leads to the line.

Figure 8 is an elevational view illustrating a modified form of my invention wherein several of the attaching devices as shown in Figures 1 and 2 are applied to the fishing line and a sinker is applied to the free end of the fishing line and the latter having provision for also attaching fishing hook leads to the line, in accordance with my invention.

Figure 9 is a plan view with a section of one of the devices removed showing the connection of the line thereto when the device is arranged at a place on the fishing line remote from its free end.

Figure 10 is a vertical sectional view illustrating the sinker and its connection to the fishing line at the free end thereof as well as the connection of fishing hook leads thereto.

Figure 11 is a sectional view taken on the line 11—11 of Figure 10.

Figure 12 is a sectional view taken on the line 12—12 of Figure 10.

Referring in detail to the drawings, the numeral 5 indicates the body of the device, preferably tapering toward each end, as shown in Figures 1 and 2 of the drawings. The body 5 is provided with a removable section 6 and when said section is detached from the body, the latter then has therein a recess 7 having a substantially flat bottom wall and outwardly inclined end walls 8. The bottom wall is provided with grooves 9 extending transversely of the body from one side thereof to the opposite side. Further, the body is provided with bores 10 extending inwardly from the ends thereof to the recess 7 and connecting with the grooves 9. A screw threaded socket 11 is provided in the bottom wall of the recess 7 of the body and preferably arranged centrally of the recess to align with an opening 12 of the removable section 6 when applied to the body. A screw or like fastener 13 extends through the opening of the removable section and is threaded into the socket 11 to removably secure the section in place to completely close the recess 7.

Pins 14 are secured in the body and extend through the grooves 9 within the recess 7 and are adapted to be received within sockets 15 provided in the removable section 6. The removable section is also provided with grooves 16 to match the grooves 9 when the section 6 is arranged within the recess 7 with the pins fitting in the sockets 15.

The purpose of the pins is to secure in the grooves of the device a fishing line 17 and a plurality of fishing hook leads 18. The fishing line extends through one of the bores 10 and is provided with a loop 19 arranged about one of the pins. The leads 18 have loops 20 which are placed over the pins. The application of the line and the leads takes place when the section 6 is removed. After the proper application of the line and the leads to the body as specified, the section 6 is secured in place on the body with the pins extending into the sockets 15 preventing the loops of the line and leads from moving off of the pins. It is to be noted that one of the leads extends through the other bore of the body opposite to the bore received in the fishing line 17.

The body thus secured to the free end of the fishing line, attaches to the latter a plurality of hooks and when the body is thus used it is preferably made of a heavy material so as to act as a sinker as well as a means of connecting to the line a plurality of fishing hook leads without the necessity of tying and untying knots. However, several of the described devices or bodies may be applied at selected places along the fishing line, as shown in Figure 8, and have connected to the free end of the fishing line a sinker 22 constructed in accordance with the present invention and which also detachably connects to the fishing line a plurality of fishing hook leads.

In adapting several of the bodies 5 to the fishing line at selected places, as shown in Figure 8, the fishing line is threaded through the bores 10 and is brought about the pins 14, as shown in Figure 9, which will prevent the body 5 from slipping endwise of the line. Of course, it is to be understood that the leads of the hooks may be applied to the pins 14 prior to wrapping the fishing line about said pins. Or, if desired, the leads may be applied to the pins after the fishing line has been wrapped about said pins. The removable sections 6 are then secured to the bodies tightly securing the latter to the fishing line against accidental slippage endwise of the line. The bodies when applied to the line as shown in Figure 8, are preferably constructed of light weight material so as not to cause the portions of the fishing line to which they are connected to sink in the water and, if desired, may be constructed of such light material as to have a slight buoyant effect to the fishing line.

The sinker 22 consists of a cylindrical body 23, one end portion of which is tapered and the other end portion, indicated by the character 24, is removable, being secured in place by a retaining screw 25 that also acts to secure to the body 23 a plurality of fishing hook leads 26. The body 23 adjacent its tapered end is provided with a recess 27 normally closed by a removable section 28 secured in place by a retaining screw 29. The removable end portion 24 is provided with openings 30 to allow the leads 26 to extend thereinto so that the retaining screw 25 may pass through the loops of said leads. The body 23 further is provided with openings 31 connecting with the recess 27 to permit leads 32 to enter the recess and be applied to the retaining screw 29.

The body 23 within the tapered end of the latter is provided with a bore 33 connecting with the recess 27 so that the fishing line may extend into the recess 27 and have its loop applied to the retaining screw 29. It will, therefore, be seen that the body 23 besides acting as a sinker for the free end of the fishing line also may act to secure to the fishing line a plurality of fishing hook leads and that the openings 30 and 31 thereof will sustain the leads separated from one another assisting in maintaining the fishing hooks spread apart and thus arranging the bait thereon easy for fish to take.

The removal of the retaining screws 25 and 29 will quickly detach the fishing line from the body as well as the leads 26 and 32.

While I have shown and described the preferred embodiment of my invention, it will be understood that minor changes in construction, combination and arrangement of parts may be made without departing from the spirit and scope of the invention as claimed.

Having thus described the invention, what I claim is:

1. In an attachment for a fishing line, a body having a recess and bores connecting therewith, a removable section fitting in said recess, a screw removably securing the removable section to the body, and pins secured to the body and removably secured to the removable section.

2. In an attachment for fishing lines, a body tapering toward the opposite ends thereof and having a recess substantially intermediate said ends and bores connecting with the recess and extending through said ends, pins carried by the body within the recess, a removable section fitting said recess and having sockets to receive the pins, and a screw detachably securing the removable section to the body.

3. In a fishing line attachment, an elongated body having a removable end portion and provided with a plurality of transverse openings in said removable end portion, and a longitudinal screw detachably securing the removable end portion to the body proper, the screw intersecting said transverse openings and constituting means for detachably securing a fishing line part to said removable body end portion.

4. In an attachment for fishing lines, a body, one end portion of said body having a plurality of transverse openings and a longitudinal bore connecting with said openings, and a screw extending through the longitudinal bore and threaded into the adjacent part of the body, the screw constituting means for detachably connecting a fishing line part to the body with the part inserted through one of said openings.

5. In an attachment for fishing lines, a body, one end portion of said body having a plurality of transverse openings and a longitudinal bore connecting with said openings, a screw extending through the bore and threaded into the adjacent part of the body, the screw constituting means for detachably connecting a plurality of fishing line parts to the body, said body having a recess in a side thereof adjacent its opposite end and a plurality of transverse openings connecting with said recess together with a longitudinal bore in the adjacent end portion of the body and connecting with the recess and with said companion transverse openings, a removable section for closing said recess, and a screw detachably securing the removable section to the body and also affording means for the attachment of a fishing line part to the body.

DEWEY P. MERCIER.